US012613750B2

(12) United States Patent
Chahal et al.

(10) Patent No.: US 12,613,750 B2
(45) Date of Patent: Apr. 28, 2026

(54) WORKLOAD CHARACTERIZATION-BASED CAPACITY PLANNING FOR COST-EFFECTIVE AND HIGH-PERFORMANCE SERVERLESS EXECUTION ENVIRONMENT

(71) Applicant: Tata Consultancy Services Limited, Mumbai (IN)

(72) Inventors: Dheeraj Chahal, Pune (IN); Rekha Singhal, Thane West (IN); Surya Chaitanya Venkata Palepu, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 652 days.

(21) Appl. No.: 18/061,541

(22) Filed: Dec. 5, 2022

(65) Prior Publication Data

US 2023/0185625 A1 Jun. 15, 2023

(30) Foreign Application Priority Data

Dec. 14, 2021 (IN) .............................. 202121058253

(51) Int. Cl.
*G06F 9/50* (2006.01)
*G06F 9/54* (2006.01)

(52) U.S. Cl.
CPC .............. *G06F 9/505* (2013.01); *G06F 9/544* (2013.01)

(58) Field of Classification Search
CPC ................................. G06F 9/505; G06F 9/544
(Continued)

(56) References Cited

U.S. PATENT DOCUMENTS

2005/0050395 A1* 3/2005 Kissell .................. G06F 9/3851
712/E9.032
2017/0177221 A1* 6/2017 Trehan ................ H04L 67/1097
(Continued)

OTHER PUBLICATIONS

Gueyoung Jung et al., "Recommending Optimal Cloud Configuration based on Benchmarking in Black-Box Clouds," International Conference on Cloud Computing, Oct. 2013, Academia.edu, https://www.researchgate.net/publication/260390807_Recommending_Optimal_Cloud_Configuration_based_on_Benchmarking_in_Black-Box_Clouds/link/0f317530fa1ba1420b000000/download.
(Continued)

*Primary Examiner* — April Y Blair
*Assistant Examiner* — Justin Che-Chun Tong
(74) *Attorney, Agent, or Firm* — Finnegan, Henderson, Farabow, Garrett & Dunner, LLP

(57) ABSTRACT

Recent techniques for workload characterization of an application to be executed in a serverless execution environment or cloud are based on benchmark-approximation. Multiple microbenchmarks are run against the multiple VM configurations and a score is calculated which is used for mapping futuristic workloads to the appropriate configuration. Embodiments herein disclose method and system for workload characterization-based capacity planning of an actual application running on-premise with different configurations of the same machine and providing a cost-effective and high-performance serverless execution environment. Resource demand of each API in the application workflow is evaluated. Based on the resource demand of each API, a mapping is performed to the serverless platform on cloud. Additionally, characterization of threads within each API is performed and each thread is mapped to a serverless instance based on its resource requirements.

9 Claims, 13 Drawing Sheets

(58) Field of Classification Search
USPC ........................................ 718/102, 104, 105
See application file for complete search history.

(56) References Cited

U.S. PATENT DOCUMENTS

| | | | |
|---|---|---|---|
| 2019/0108067 A1* | 4/2019 | Ishikawa | H04L 41/50 |
| 2020/0314174 A1* | 10/2020 | Dailianas | G06F 9/45558 |
| 2021/0160191 A1* | 5/2021 | Ghosh | H04L 47/83 |
| 2021/0256635 A1* | 8/2021 | Cali | G06Q 20/405 |
| 2021/0271872 A1* | 9/2021 | Gupta | G06N 3/0442 |
| 2022/0318060 A1* | 10/2022 | Choochotkaew | G06N 5/02 |

OTHER PUBLICATIONS

Heungsoon Felix Lee et al., "The Optimal Configuration and Workload Allocation Problem in Flexible Manufacturing Systems," International Journal of Flexible Manufacturing Systems, Jun. 1991, pp. 213-230, Springer, https://www.researchgate.net/publication/30846278_The_optimal_configuration_and_workload_allocation_problem_in_flexible_manufacturing_systems/link/02e7e528cea01a6fe6000000/download.

Ali Aalsaud et al., "Low-Complexity Run-time Management of Concurrent Workloads for Energy-Efficient Multi-Core Systems," Journal of. Low Power Electronics. Applications, Aug. 2020, vol. 10(3), MDPI, https://www.mdpi.com/2079-9268/10/3/25.

Hossein Sayadi, "Energy-Efficiency Prediction of Multithreaded Workloads on Heterogeneous Composite Cores Architectures using Machine Learning Techniques," Hardware Architecture, 2018, Arxiv, https://arxiv.org/ftp/arxiv/papers/1808/1808.01728.pdf.

* cited by examiner

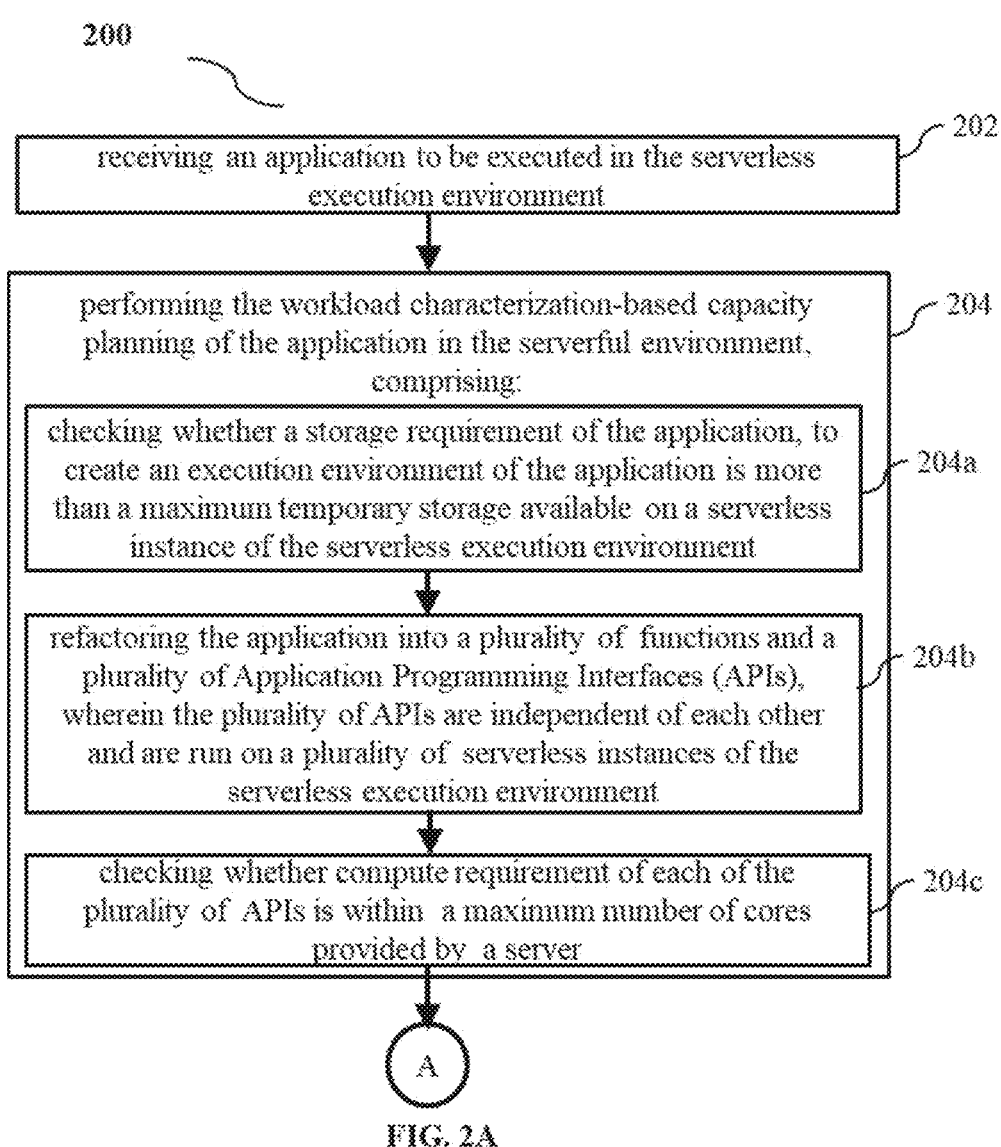

200

202 receiving an application to be executed in the serverless execution environment

204 performing the workload characterization-based capacity planning of the application in the serverful environment, comprising:

204a checking whether a storage requirement of the application, to create an execution environment of the application is more than a maximum temporary storage available on a serverless instance of the serverless execution environment 204b refactoring the application into a plurality of functions and a plurality of Application Programming Interfaces (APIs), wherein the plurality of APIs are independent of each other and are run on a plurality of serverless instances of the serverless execution environment 204c checking whether compute requirement of each of the plurality of APIs is within a maximum number of cores provided by a server

☒ OCR

☐ Data Type

☒ Spatial Relationship Creator

☐ Table Detection

WORKLOAD CHARACTERIZATION-BASED CAPACITY PLANNING FOR COST-EFFECTIVE AND HIGH-PERFORMANCE SERVERLESS EXECUTION ENVIRONMENT

PRIORITY CLAIM

This U.S. patent application claims priority under 35 U.S.C. § 119 to: Indian Patent Application No. 202121058253, filed on Dec. 14, 2021. The entire contents of the aforementioned application are incorporated herein by reference.

TECHNICAL FIELD

The embodiments herein generally relate to serverless execution environment and, more particularly, to a method and system for workload characterization-based capacity planning of an application for cost-effective and high-performance serverless execution environment.

BACKGROUND

Serverless platform is a cloud computing execution model that provides auto-scaling, high availability, and a pay-for-value cost model. It simplifies the application deployment as the service provider manages resources including Operating Systems (OSs), runtimes, libraries, etc., that allow users to focus on code development. In the past, serverless platforms were used for small application functions requiring limited resources such as compute cores, memory, and stateful storage. However, due to the provisioning of more resources per serverless instance by cloud vendors, serverless platforms are being used for deploying Artificial Intelligence (AI) workloads as well. Thus, importance of memory size of serverless instances for cost-effective deployment of the application has been emphasized by researchers in many works. However, most of the cost optimization techniques ignore the memory configuration of the serverless instances. An existing approach that predicts size of serverless instances for application execution, relies on synthetic benchmarks. Such benchmark based prediction does not capture the variations in requirements of actual application to be executed and are not able to predict optimal resource requirements specific to the application.

SUMMARY

Embodiments of the present disclosure present technological improvements as solutions to one or more of the above-mentioned technical problems recognized by the inventors in conventional systems. For example, in one embodiment, a method for workload characterization-based capacity planning of an application for cost-effective and high-performance serverless execution environment is provided.

The method includes receiving an application to be executed in the serverless execution environment. Further, the method includes performing the workload characterization-based capacity planning of the application in a serverful execution environment. The workload characterization comprises steps of: A) Checking whether a storage requirement of the application, to create an execution environment of the application, is more than a maximum temporary storage available on a serverless instance of the serverless execution environment. B) Refactoring the application into a plurality of Application Programming Interfaces (APIs) if the storage requirement is more than the maximum temporary storage. The plurality of APIs are independent of each other and are run on a plurality of serverless instances of the serverless execution environment. A Point to Point (P2P) communication between the newly created APIs is performed using an Elastic File System (EFS) enabling the plurality of APIs to read and write the data from the EFS. C) Checking whether compute requirement of each of the plurality of APIs is within a maximum number of cores provided by the serverless execution environment. D) Running each data unit from among a plurality of data units of a dataset used by the application for each of the plurality of APIs on the serverful execution environment by varying number of cores provided by a server in the serverful environment from a minimum number of cores to the maximum number of cores if the compute requirement is satisfied by the maximum number of cores. Data units in the dataset comprise a mix of identical data units and unidentical data units for similar type of data. E) Determining an average execution time for each data unit of the dataset for each of the plurality of APIs. F) Recording an optimal number of cores for each of the plurality of APIs, beyond which there is no further decrease in the execution time of each of the plurality the APIs. G) Configuring the plurality of serverless instances for executing the application in accordance with the optimal number of cores for each of the plurality of APIs in the serverless computing environment.

In another aspect, a system for workload characterization-based capacity planning of an application for cost-effective and high-performance serverless execution environment is provided. The system comprises a memory storing instructions; one or more Input/Output (I/O) interfaces; and one or more hardware processors coupled to the memory via the one or more I/O interfaces, wherein the one or more hardware processors are configured by the instructions to receive an application to be executed in the serverless execution environment. Further, the system is configured to perform the workload characterization-based capacity planning of the application in a serverful execution environment. The workload characterization comprises steps of: A) Checking whether a storage requirement of the application, to create an execution environment of the application, is more than a maximum temporary storage available on a serverless instance of the serverless execution environment. B) Refactoring the application into a plurality of Application Programming Interfaces (APIs) if the storage requirement is more than the maximum temporary storage. The plurality of APIs are independent of each other and are run on a plurality of serverless instances of the serverless execution environment. A Point to Point (P2P) communication between the newly created APIs is performed using an Elastic File System (EFS) enabling the plurality of APIs to read and write the data from the EFS. C) Checking whether compute requirement of each of the plurality of APIs is within a maximum number of cores provided by the serverless execution environment. D) Running each data unit from among a plurality of data units in a dataset used by the application for each of the plurality of APIs on the serverful execution environment by varying number of cores provided by a server in the serverful environment from a minimum number of cores to the maximum number of cores if the compute requirement is satisfied by the maximum number of cores. Data units in the dataset comprise a mix of identical data units and unidentical data units for similar type of data. E) Determining an average execution time for each data unit of the dataset for each of the plurality of APIs. F) Recording an optimal number of cores for each of the plurality of APIs, beyond which there is no further decrease in the execution time of each of the plurality the APIs. G) Configuring the plurality of serverless instances for executing the application in accordance with the optimal number of cores for each of the plurality of APIs in the serverless computing environment.

In yet another aspect, there are provided one or more non-transitory machine-readable information storage mediums comprising one or more instructions, which when executed by one or more hardware processors causes a method for workload characterization-based capacity planning of an application for cost-effective and high-performance serverless execution environment. The method includes receiving an application to be executed in the serverless execution environment. Further, the method includes performing the workload characterization-based capacity planning of the application in a serverful execution environment. The workload characterization comprises steps of: A) Checking whether a storage requirement of the application, to create an execution environment of the application, is more than a maximum temporary storage available on a serverless instance of the serverless execution environment. B) Refactoring the application into a plurality of Application Programming Interfaces (APIs) if the storage requirement is more than the maximum temporary storage. The plurality of APIs are independent of each other and are run on a plurality of serverless instances of the serverless execution environment. A Point to Point (P2P) communication between the newly created APIs is performed using an Elastic File System (EFS) enabling the plurality of APIs to read and write the data from the EFS. C) Checking whether compute requirement of each of the plurality of APIs is within a maximum number of cores provided by the serverless execution environment. D) Running each data unit from among a plurality of data units in a dataset used by the application for each of the plurality of APIs on the serverful execution environment by varying number of cores provided by a server in the serverful environment from a minimum number of cores to the maximum number of cores if the compute requirement is satisfied by the maximum number of cores. Data units in the dataset comprise a mix of identical data units and unidentical data units for similar type of data. E) Determining an average execution time for each data unit of the dataset for each of the plurality of APIs. F) Recording an optimal number of cores for each of the plurality of APIs, beyond which there is no further decrease in the execution time of each of the plurality the APIs. G) Configuring the plurality of serverless instances for executing the application in accordance with the optimal number of cores for each of the plurality of APIs in the serverless computing environment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A and 2B (collectively referred as FIG. 2) is a flow diagram illustrating a method for workload characterization-based capacity planning of the application for cost-effective and high-performance serverless execution environment, using the system of FIG. 1, in accordance with some embodiments of the present disclosure.

Figure 1:
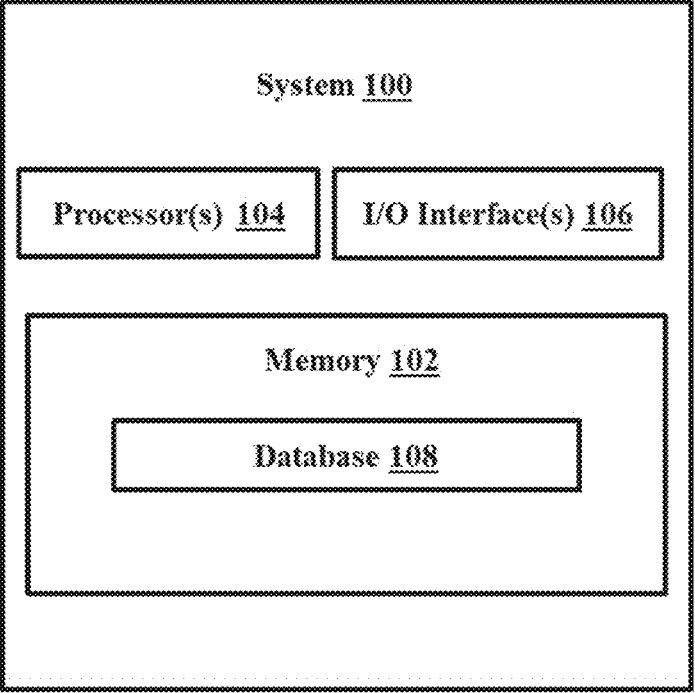
FIG. 1 is a functional block diagram of a system for workload characterization-based capacity planning of an application for cost-effective and high-performance serverless execution environment, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Workload characterization is a well-known technique for capacity planning. The traditional characterization approach is based on finding the resource utilization of the whole application for a given workload. Application is then deployed on a computer system based on its peak resource requirement. Although serverless architecture provides high scalability, it has some inherent constraints such as limited computing (please verify) capacity, statelessness, and inability of instances to communicate with each other. Hence traditional characterization approach is not suitable for capacity planning in serverless instances. Recent techniques for workload characterization of an application to be executed in a serverless execution environment or cloud, are based on benchmark-approximation. Multiple microbenchmarks are running against the multiple Virtual Machine (VM) configurations and a score is calculated which is used for mapping futuristic workloads to the appropriate configuration. Such benchmark based prediction does not capture the variations in requirements of actual application to be executed and are not able to predict optimal resource requirements specific to the application or the workload.

Embodiments herein disclose method and system for workload characterization-based capacity planning of an application for cost-effective and high-performance serverless execution environment when serverless architecture is offered as function as a Service (FaaS). In FaaS, the applications run only in response to events or requests. The method first evaluates resource demand of each Application Programming Interface (API) in the application workflow using a serverful execution environment, such as an on-premises server. Thereafter, based on the resource demand of each API, a mapping is performed to the serverless execution platform on the cloud. Additionally, workload characterization of threads within each API is performed and each thread is mapped to a serverless instance based on its resource requirements.

Thus, rather than approximation approach, the method disclosed herein performs actual workload characterization of the application to be executed, by determining real time requirements of the application and accordingly planning serverless execution for the application. This enables mapping of more optimal application resource requirements to the serverless platform, providing a cost effective and high performance execution of applications in the FaaS serverless architecture. The workload characterization disclosed herein is suitable for deploying deep learning workflows on serverless execution environments, interchangeably referred as serverless architecture or serverless platforms.

The method also provides a cost model that generates recommendations, based on cost and performance trade-offs, for selecting a deployment architecture of the serverless execution environment.

Referring now to the drawings, and more particularly to FIGS. 1 through 5D, where similar reference characters denote corresponding features consistently throughout the figures, there are shown preferred embodiments and these embodiments are described in the context of the following exemplary system and/or method.

FIG. 1 is a functional block diagram of a system 100 for workload characterization-based capacity planning of an application for cost-effective and high-performance serverless execution environment, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes modules such as a workload characterization module (not shown) for workload characterization-based capacity planning of the application for cost-effective and high-performance serverless execution environment. Further, the memory 102 includes an application deployment cost computation module (not shown) that estimates. Further, the memory 102 may comprise information pertaining to input(s)/output(s) of each step performed by the processor(s) 104 of the system 100 and methods of the present disclosure. Further, the memory 102 includes a database 108. In an embodiment, the database 108 may be external (not shown) to the system 100 and coupled to the system via the I/O interface 106. Functions of the components of the system 100 are explained in conjunction with flow diagram of FIG. 2 and workload characterization of an example 'document reader' application of FIG. 3.

Figure 2B:
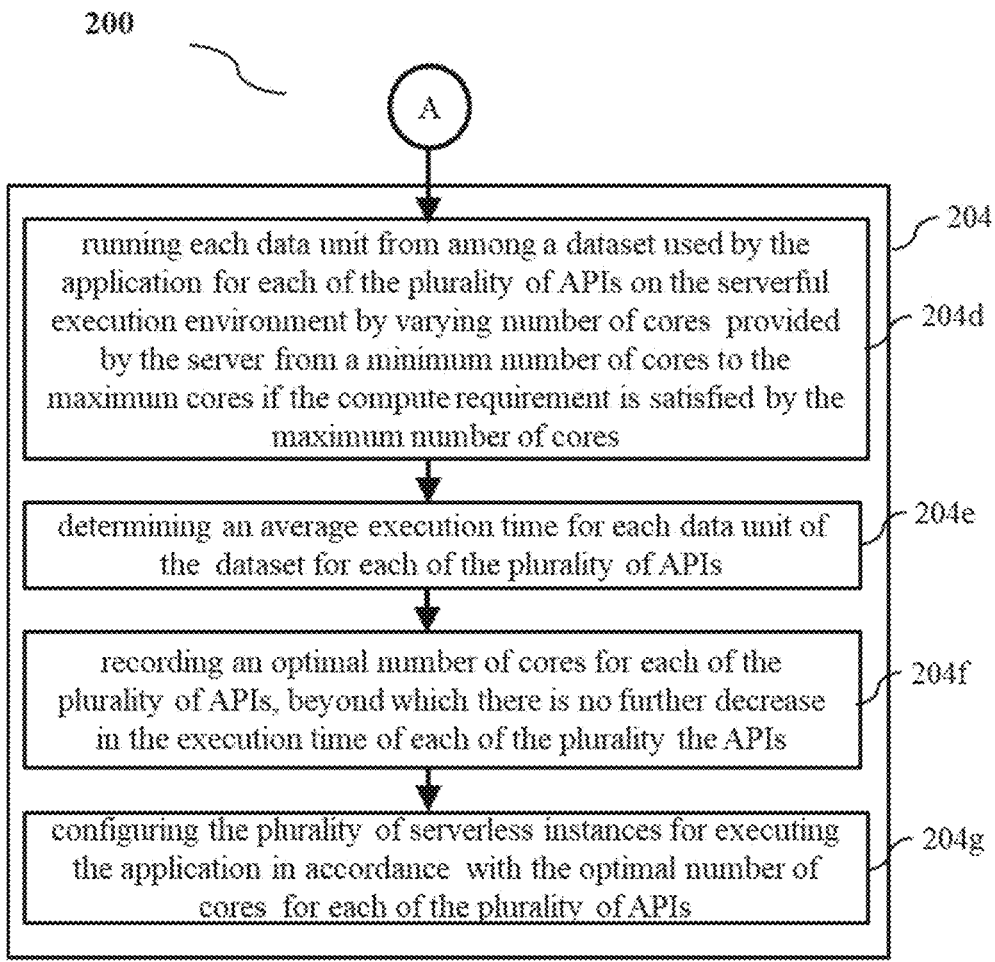

FIGS. 2A and 2B (collectively referred as FIG. 2) is a flow diagram illustrating a method 200 for workload characterization-based capacity planning of the application for cost-effective and high-performance serverless execution environment, using the system of FIG. 1, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

The method is better explained in conjunction with FIGS. 3A through 3G (collectively referred as FIG. 3), which depicts workload characterization based capacity planning performed by the system of FIG. 1 for the example document reader application for execution in an example serverless execution environment, in accordance with some embodiments of the present disclosure.

Referring to the steps of the method 200, at step 202 of the method 200, the one or more hardware processors 104 receive an application to be executed in the serverless execution environment. At step 204 of the method 200, the workload characterization module (not shown) executed by the one or more hardware processors 104 performs the workload characterization-based capacity planning of the application using the serverful execution environment. The steps of workload characterization-based capacity planning are listed below:

a) Check whether a storage requirement of the application, to create an execution environment of the application, is more than a maximum temporary storage available on a serverless instance of the serverless execution environment. Taking into consideration the maximum resources provided by a target environment (serverless platform) where the application is to be actually executed is important reference during workload characterization of the application for a specific serverless architecture that is to be used (204*a*).

b) Refactor the application into a plurality of functions and a plurality of Application Programming Interfaces (APIs) if the storage requirement is more than the maximum temporary storage, such that the plurality of APIs are independent of each other and can be run on a plurality of serverless instances of the serverless execution environment. A Point to Point (P2P) communication between the newly created APIs is performed using an Elastic File System (EFS) enabling the plurality of APIs to read and write the data from the EFS (204*b*).

c) Check whether compute requirement of each of the plurality of APIs is within a maximum number of cores provided by the serverless execution environment. (204*c*) Further when the compute requirement of one or more APIs among the plurality of API is not satisfied by the maximum number of cores, then the method 200, at step 204*c* also performs one of the following action:

1. Refactoring the one or more APIs into multiple APIs till the compute requirement is reduced below the maximum number of cores.

2. Launching each thread on a unique serverless instance, if one or more APIs have a multi-threaded component.

d) Run each data unit from among a plurality of data units of a dataset used by the application for each of the plurality of APIs on a server in the serverful execution environment by varying number of cores provided by the server from a minimum number of cores to the maximum number of cores if the compute requirement is satisfied by the maximum number of cores. The data units in the dataset comprise a mix of identical data units and unidentical data units for similar type of data (204*d*). For example, the dataset may comprise images of different sizes. For example, each image among the set of input data images which can be of varying sizes are used and APIs are executed.

e) Determine an average execution time for each data unit of the dataset for each of the plurality of APIs (204*e*).

f) Record an optimal number of cores for each of the plurality of APIs, beyond which there is no further decrease in the execution time of each of the plurality the APIs (204*f*).

g) Configure the plurality of serverless instances for executing the application in accordance with the optimal number of cores for each of the plurality of APIs in the serverless computing environment (204*g*).

Figure 3A:
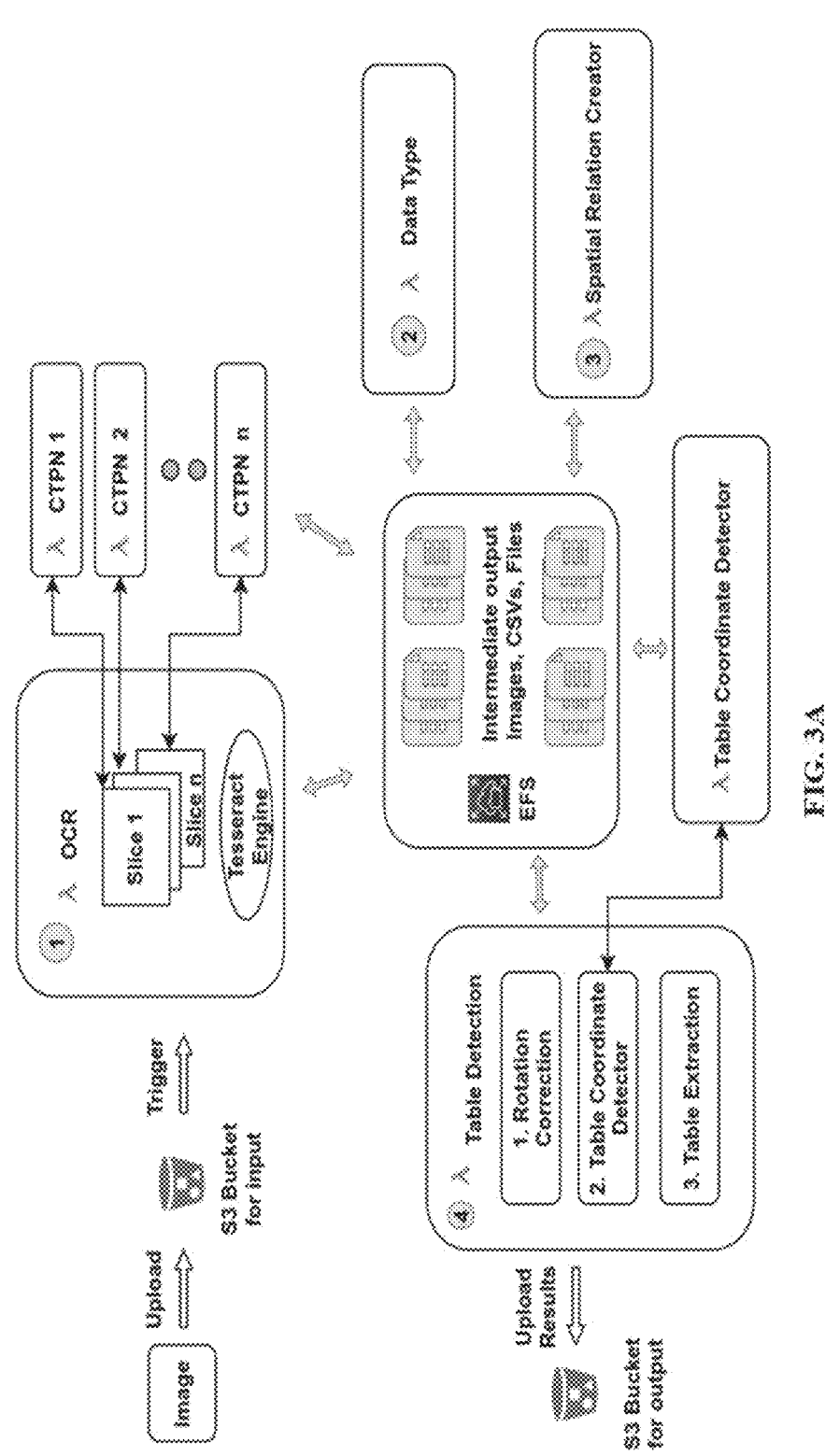
FIGS. 3A through 3G (collectively referred as FIG. 3) depicts workload characterization based capacity planning performed by the system of FIG. 1 for an example document reader application for execution in a serverless execution environment, in accordance with some embodiments of the present disclosure.
Figure 3B:
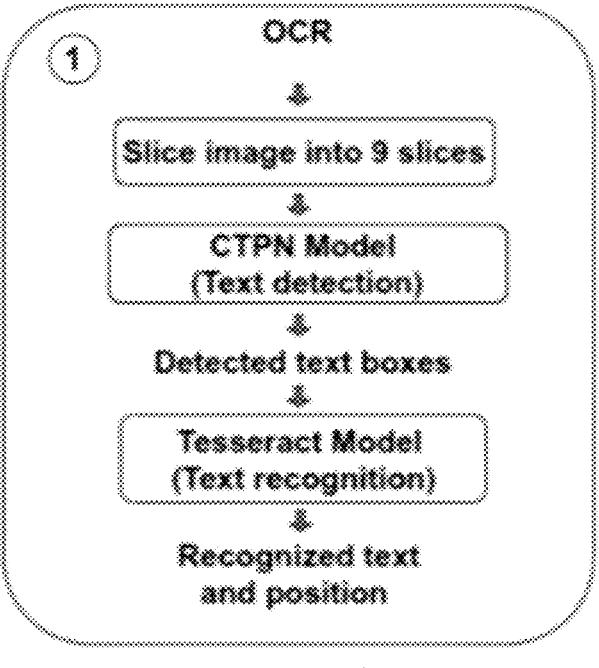

FIG. 3A depicts an overall architecture and process overview of the workload characterization of the document reader also referred to as Deep Reader application. The Deep Reader herein is an illustrative example and the method 200 can be extended to any other application consisting of multiple APIs. The Deep Reader is a deep learning application for information extraction from document images. It consists of multiple state-of-the-art computer vision algorithms and deep learning models. Deep Reader consist of four major APIs as depicted in FIG. 3B, FIG. 3C, FIG. 3D and FIG. 3E, also depicting logical flow of the Deep Reader application from FIG. 3B through 3E. The four APIs are identified by the system 100, as in step 204*b*.

1. Optical Character Recognition (OCR) API: The OCR API is the most frequently used API. It is used to extract words, sentences, and text blocks from the document along with their coordinates. The major components of OCR are the Connectionist Text Proposal Network (CTPN)™ model and Tesseract™ for detection and recognition of the text in the document, respectively.

2. Data Type API: To detect the semantic data types of detected entities

3. Spatial Relation Creator API: To identify the relationship existing amongst the objects present in the document.

4. Table Detection API: This API identifies the tables in the document and retrieves the data to save in a comma-separated values (CSV) format.

Figure 3C:
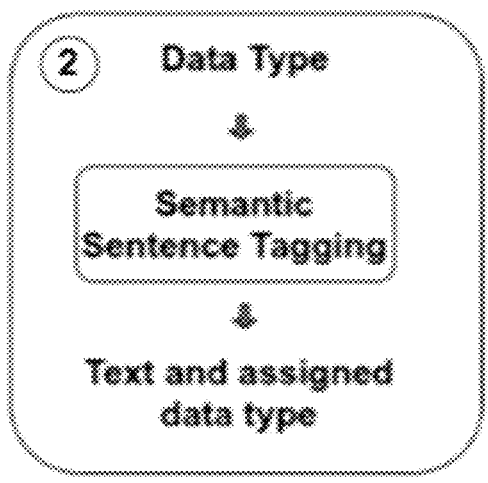
Figure 3D:
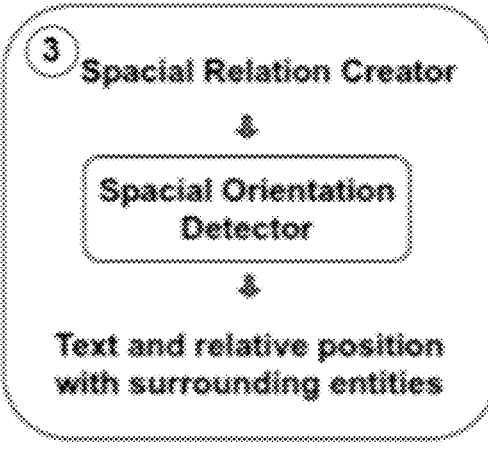
Figure 3E:
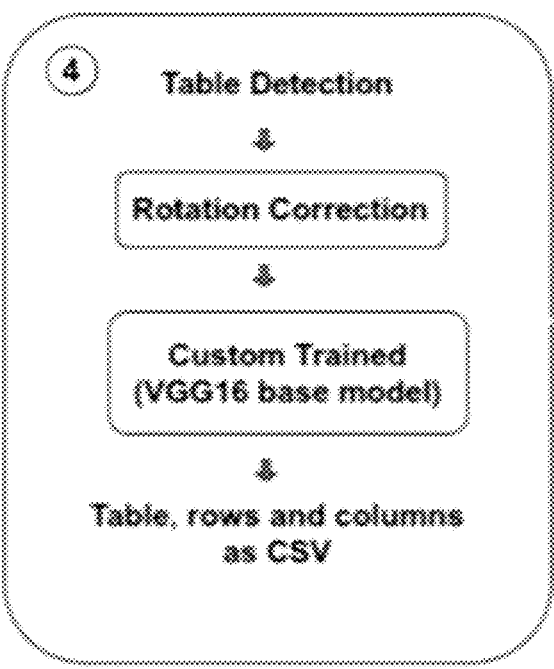

The set of APIs used in the processing of a document depends upon contents of the document. The OCR API is the most frequently used API and is used in the processing of most documents. Hence, it is a part of most of the workflows. It is also computation intensive and consumes a large amount of the total processing time of a document. For a given document, the service demand of each of these APIs is unique. FIGS. 3C, 3D and 3E depict a illustrative sample document sliced and processed by the Deep Reader application for information extraction. The number of slices created is based on the performance gain achieved such that the parallelization overhead due to multiple slice creation should be less than the execution time gain by executing these slices in parallel. The processing time of a document using all four APIs in a workflow is in the proportion shown in FIG. 3G. To accelerate the execution of the OCR API, the input document is sliced into nine parts. Each slice is processed for text detection by the CTPN™ model in parallel. The CTPN™ model then returns the coordinates of the bounding boxes containing the text. It also identifies the overlapping boxes and combines them. Only the unique polygon batch is generated as an output. The output generated from the CTPN™ models is later consumed by the Tesseract™ engine for text recognition. Finally, text blocks and sentences mapped to their coordinates is the output of OCR API.

Figure 3F:
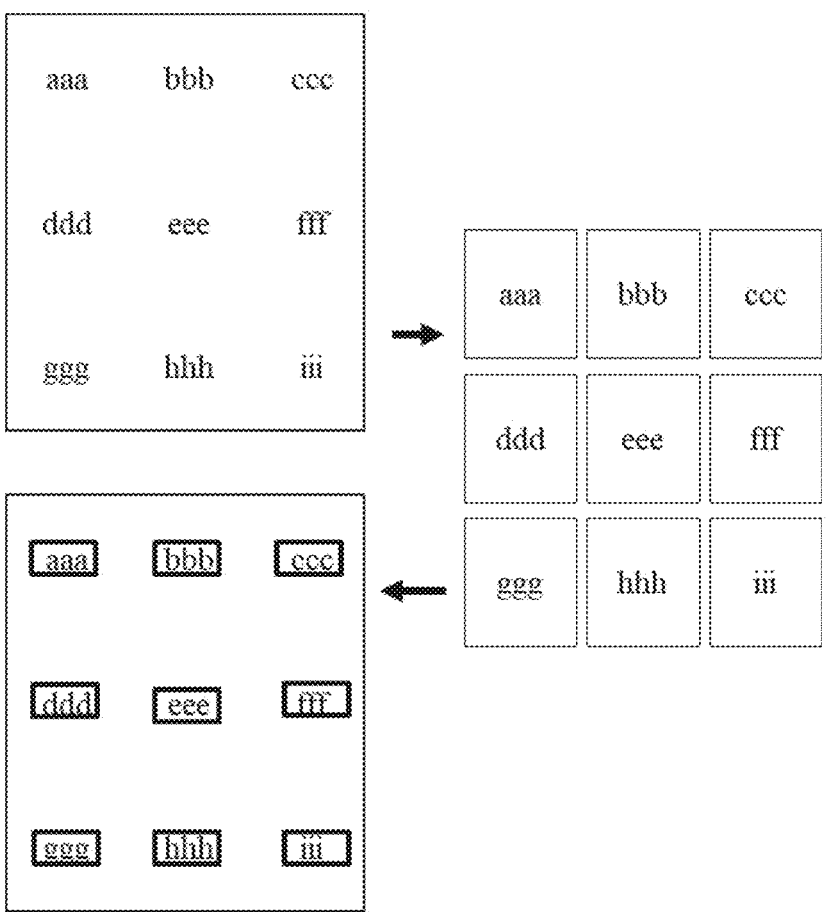
Figure 3G:
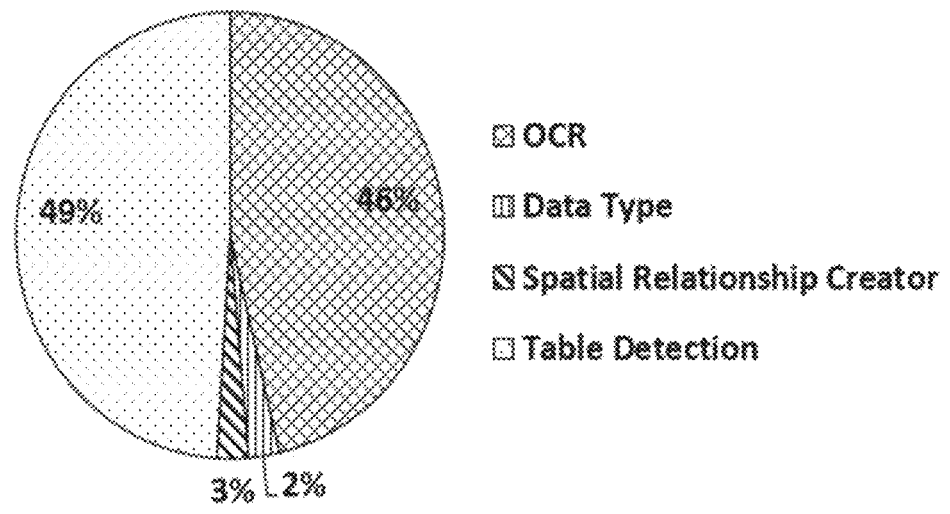

As mentioned, at step 204 the workload characterization is performed on the Deep Reader application and is explained in conjunction with the illustrative sample document, which is processed as a set of multiple slices of the document image and the text information is extracted, as depicted in FIG. 3F, for creating the plurality of serverless instances that are cost-effective and provide high scalability. However, some inherent constraints require refactoring the application (Deep Reader) and associated frameworks as performed by the method disclosed herein and explained in conjunction with steps 204*a* through 204*c*.

In one example implementation for experiments and performance analysis of the method 200 disclosed herein, the system 100 utilizes a AWS Lambda™ serverless platform for execution of the plurality of serverless instances of the Deep Reader application. Serverless functions are stateless by nature. Very small temporary storage is available with each instance of serverless. For example, AWS Lambda™ allocates only 500 MB of temporary storage with each instance during runtime and only 250 MB of storage for deployment packages. The Deep Reader utilizes a Tensor-Flow Framework™, which is approximately 220 MB in size. The framework and libraries of the Deep Reader are trimmed to accommodate them with the function code. For example, the Tensorboard and packages from the Tensor-Flow™ are removed to reduce its size to 112 MB. Additionally, any library or model shared across APIs or multiple functions such as OpenCV and Tesseract is loaded in the AWS Lambda™ layer7 for sharing. The AWS Lambda™ layer allows code or data sharing as a .zip archive. It is also used to save libraries, configuration files, and a custom runtime. Another challenge in serverless architecture is cold start latency. For each new request, there is a cold start latency due to time spent in creating an execution environment for the function. The cold start latency is non-deterministic and difficult to predict. The system 100 disclosed herein addresses this issue by using provisioned concurrency available in the AWS Lambda™. Provisioned concurrency results in a deterministic cold start; however, at an additional cost in comparison to the non-provisioned resources.

AWS Storage Services: AWS Lambda™ provides various cloud services for storing data. In the system implementation herein Simple Storage Service(S38) and Elastic File System (EFS9) are used. S3 is an object storage service for storing and retrieving data from anywhere. S3 provides high scalability, data availability, security, and performance. EFS is a serverless elastic file system. It allows sharing of data without the need of provisioning or managing storage, as mentioned in step 204*b*. Infrequently accessed files in are stored in S3 storage, whereas frequently accessed files are stored in EFS. Various models and images are stored on S3 as they are loaded into the memory of AWS Lambda™ instances once per invocation. However, all intermediary files that are generated and used during data pre-processing, post-processing, as well as shared by multiple APIs, are stored in EFS.

Referring to the architectural and process overview of the Deep Reader application depicted in FIG. 3A, it can be seen that the Deep Reader application, interchangeably referred herein after as Deep Reader, is deployed with six different serverless functions. Two for the OCR API, one for the Data Type API, one for Spatial Relation Creator API, and two for the Table Detection API. When an image document is uploaded by the user on S3 storage, an event is triggered to invoke the Deep Reader orchestration function which initiates the workflow. This also results in instantiating the Lambda instance for the OCR API function. The OCR API function splits the input image into 9 overlapping slices. Each slice is then processed for text detection. TensorFlow CTPN™ model is used for text detection in each of the slices. Text detection across slices is done in parallel for better execution times. Hence, 9 Lambda instances of the CTPN function are invoked synchronously by the OCR Lambda function as shown in FIG. 3A. This way each slice gets dedicated resources (cores and memory) to expedite text detection. The optimal configuration of each CTPN Lambda instance is decided using the workload characterization data as discussed in the following section. The CTPN function returns coordinates of the detected bounding boxes. These intermediate results generated by the CTPN function are then stored in the EFS mounted on the Lambda instance. On completion of the processing of the image slice by the CTPN function, the OCR function loads the results from EFS and sends them to the Tesseract™ engine for text recognition. Further in the sequence, Data Type API is invoked. It takes the results of the OCR API as an input and assigns data types to the detected entities. Likewise, when Spatial Relation Creator API is invoked in the workflow sequence, it takes the output of the OCR API as its input and establishes a positional relationship between entities of the document. The table detection API is used for processing image documents containing tables. Input to this API is the output of the OCR API. The rotation correction algorithm is executed first to stabilize the orientation of the image. The image is then sent to a custom-trained model which uses VGG16™ as a base model for table detection. The results of the model are finally processed and saved as a CSV file consisting of table data as rows and columns.

COST MODEL AND WORKLOAD CHARACTERIZATION: There are a few challenges while calculating the total cost of application deployment in a production environment. Cloud providers often share the pricing model for each of the independent services that they offer. For some of the cloud services, the cost is calculated on a per hour basis, and it is independent of the workload. For end-to-end deployment of a complex application that uses multiple services, the total cost due to each of these services depends on the distribution of the workload, scaling in each service, service features used, etc. Thus, explained is the cost model for cloud services followed by a workload characterization scheme when the application is processed by the system 100. The method 200 provides the cost model for evaluating a total cost of end-to-end deployment of the application, that utilizes a plurality of services of the serverless computation environment. The total cost is evaluated for a plurality of scenarios of usage of the plurality of services based on variations in computational requirements, storage requirements, and network requirements. The cost model generates recommendations, based on cost and performance trade-offs, for selecting a deployment architecture of the serverless execution environment.

Cost Model (Serverless architecture): The method 200 further comprises computing total cost of deployment of the application on the serverless execution environment that uses a plurality of cloud services, wherein the computation is based a plurality of components comprising a compute component $C_{Compute}$, a storage component ($C_{Storage}$), and a networking component ($C_{Network}$). The total cost is modeled by the following equations. Total compute cost is the sum of the compute cost of individual Lambda functions, and is given by the equation as below:

$$C_{compute} = C_{c1} + C_{c2} + \ldots + C_{cn} \tag{1}$$

Where $C_{ci}$ is the compute cost of $i^{th}$ function. The execution cost of an AWS lambda function is proportional to the number of function invocation requests ($n_i$), memory ($m_i$) configured (Table I) and the amount of time the function executes ($et_i$). [001] The compute cost for non-provisioned functions is calculated as:

$$C_{cnpi} = n_i \times m_i \times et_i \times C_{lamda} \tag{2}$$

Where, $C_{lamda}$ is cost per GBsec. The total cost of number of requests is:

$$C_{ri} = n_i \times C_{request} \tag{3}$$

TABLE I

| Memory (MB) | Price per 1 ms |
|---|---|
| 128 | $0.0000000021 |
| 512 | $0.0000000083 |
| 1024 | $0.0000000167 |
| 2048 | $0.0000000333 |
| 4096 | $0.0000000667 |

TABLE I-continued

| Memory (MB) | Price per 1 ms |
|---|---|
| 8192 | $0.0000001333 |
| 10240 | $0.0000001667 |

Where, $C_{request}$ is static cost per request. The total non-provisioned concurrency cost is the sum of compute cost (2) and request cost (3) as below:

$$C_{cnpti} = C_{cnpi} \times C_{ri} \tag{4}$$

The execution cost of a provisioned instance is:

$$C_{cpei} = n_i \times m_i \times et_i \times C_{provisoned} \tag{5}$$

Where, $C_{provisoned}$ is cost per GBsec for provisioned concurrency. Provisioned instances offer better and consistent cold start times and hence priced more. Besides memory, execution time, and requests, provisioned instances have an extra static price for number of instances provisioned and the total duration for which concurrency is provisioned for a function. The total static cost is calculated as:

$$C_{cpsi} = n_{pi} \times m_i \times d_p \times C_{staticprovisoned} \tag{6}$$

Where $n_{pi}$ is the concurrency provisioned, $d_p$ and $C_{staticprovisoned}$ represent the duration for which concurrency is provisioned and the static price per min for provisioned instance respectively. Using equations 3, 5, and 6, the total provisioned concurrency cost is $$C_{cpti} = C_{cpei} + C_{cpsi} + C_{ri} \tag{7}$$

Hence the total compute cost for the $i^{th}$ Lambda function is given by equation 7 in case of provisioned concurrency, and equation 4 for non-provisioned as below.

$$C_{cpti} = \begin{cases} C_{cpti} & \text{Provisioned currency} \\ C_{cnpti} & \text{Non-Provisioned currency} \end{cases} \tag{8}$$

Cost for storage depends on two main storage services namely S3 and EFS. The S3 storage cost is calculated as the amount of data stored in GB/month and the number of reads and write requests.

$$C_{S3} = (N \times C_{S3perGB}) + (n_{read} \times C_{S3read}) + (n_{write} \times C_{S3write}) \tag{9}$$

Where N is the amount of data stored in GB. Other symbols are as defined in Table II. The EFS storage cost is calculated by the amount of data stored in GB per month as below on equation 10 and the total storage cost is the aggregate of S3 and EFS cost as given in equation 11, which is the sum of equation 9 and 10.

$$C_{EFS} = (N \times C_{EFSperGB}) \tag{10}$$

$$C_{storage} = C_{S3} + C_{EFS} \tag{11}$$

TABLE II

| | |
|---|---|
| $C_{S3perGB}$ | S3 price per GB |
| $C_{EFSperGB}$ | EFS cost per GB |
| $C_{S3Write}$ | Cost for S3 PUT, COPY, POST, LIST requests |
| $C_{S3Read}$ | Cost for S3 GET, SELECT requests |
| $n_{Write}$ | Number of 'reads' to S3 |
| $n_{Read}$ | Number of 'writes' to S3 |
| $C_{S3}$ | Total S3 storage cost |
| $C_{EFS}$ | Total EFS storage cost |

For the networking of the deployed Deep Reader application with other cloud services, a Virtual Private Cloud (VPC) is set up. AWS Lambda™ functions within the VPC by default do not have internet access. This access is required to use public APIs available on the internet. To activate this access, a Network Address Translation (NAT) Gateway is set up with an appropriate routing table along with an Elastic IP. The cost of elastic IP is 0.01$ per hour. However, if it is tagged to a VPC, there is no cost. Hence, only cost is NAT Gateway hourly charge CNATperHr. So total networking cost is derived as:

$$C_{Network} = \text{Duration} \times C_{NATperHr} \tag{12}$$

Where Duration is the amount of time for which NAT, Gateway is configured. The total cost comprising all the compute, storage, and network components is given by the equation 13 below.

$$C_{Total} = C_{Compute} + C_{storage} + C_{Network} \tag{13}$$

Equation 13 is executed by the application deployment cost computation module (not shown) of system of FIG. 1, to provide total cost of deploying a complex application on cloud that uses multiple cloud services.

Workload characterization of the Deep Reader: To find the optimal configuration of the serverless instances, the workload characterization of the Deep Reader application is first carried out in a serverful environment. The cost of using serverless instances is proportional to the amount of memory configured and the execution time of the workload. The total cost of using serverless instances is calculated as given in equation 4. The static overhead cost charge imposed by cloud vendors is insignificant in comparison to the consumed GBsec cost. As an example, cost of executing a function for 10 s using 1024 MB is:

$$10 \text{ s} \times 1 \text{ GB} \times \$0.00001667 \times \$0.0000002 \tag{14}$$

Where USD 0.0000002 is static overhead. The maximum memory available with each serverless instance is 10 GB which also results in the allocation of a maximum of 6 cores for that instance. The over-provisioning of the memory for each instance results in a cost escalation, however, under provisioning results in lesser compute power and hence performance degradation. In our implementation, we instantiate multiple serverless instances in parallel to reduce the total processing time of the image. The total number of serverless instances used for processing an image is as shown in Table IV. Configuring each instance optimally results in cost savings without affecting the performance.

Figure 4A:
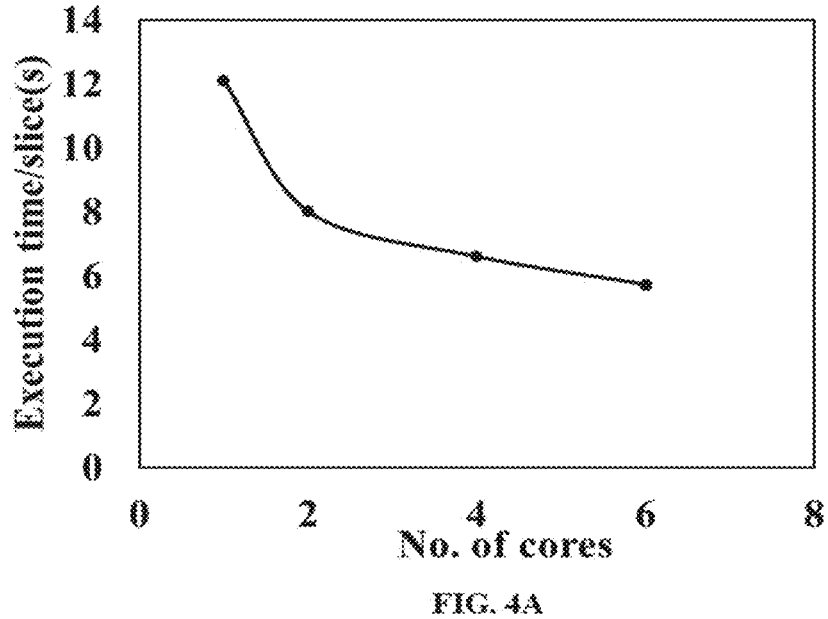
FIGS. 4A through 4F (collectively referred as FIG. 4) depict performance analysis of the document reader application, in accordance with some embodiments of the present disclosure.
Figure 4B:
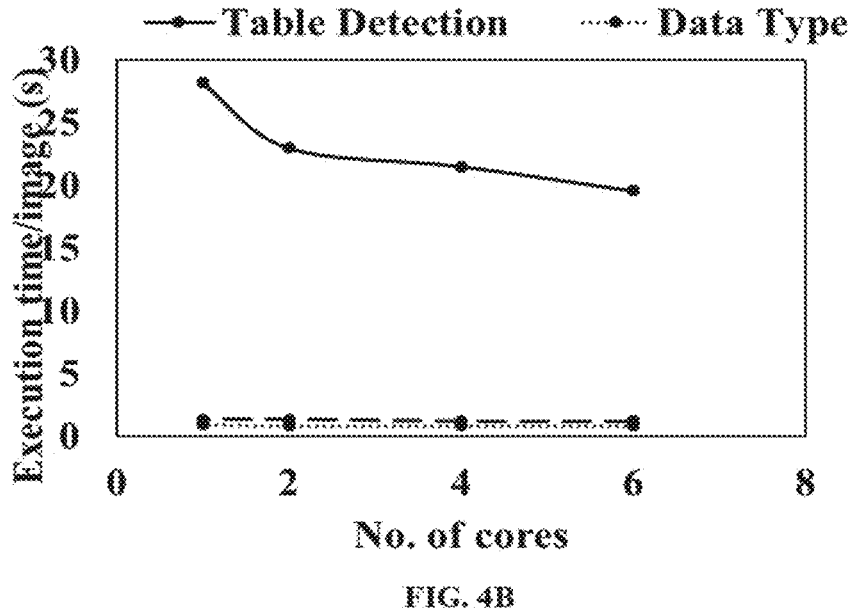
Figure 4C:
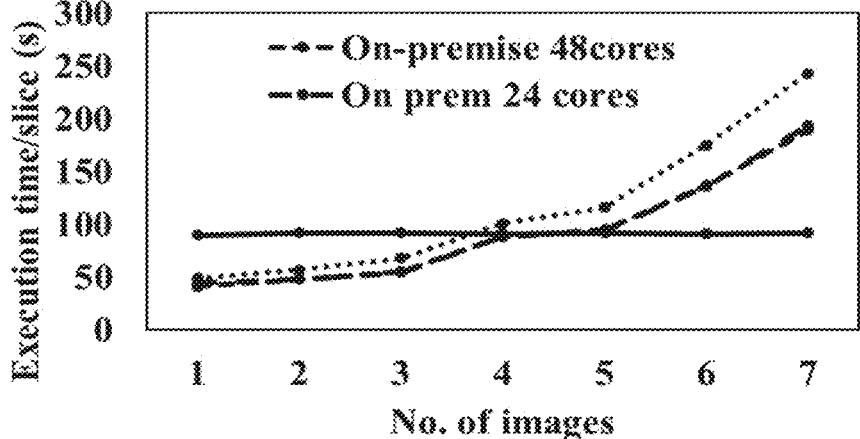
Figure 4D:
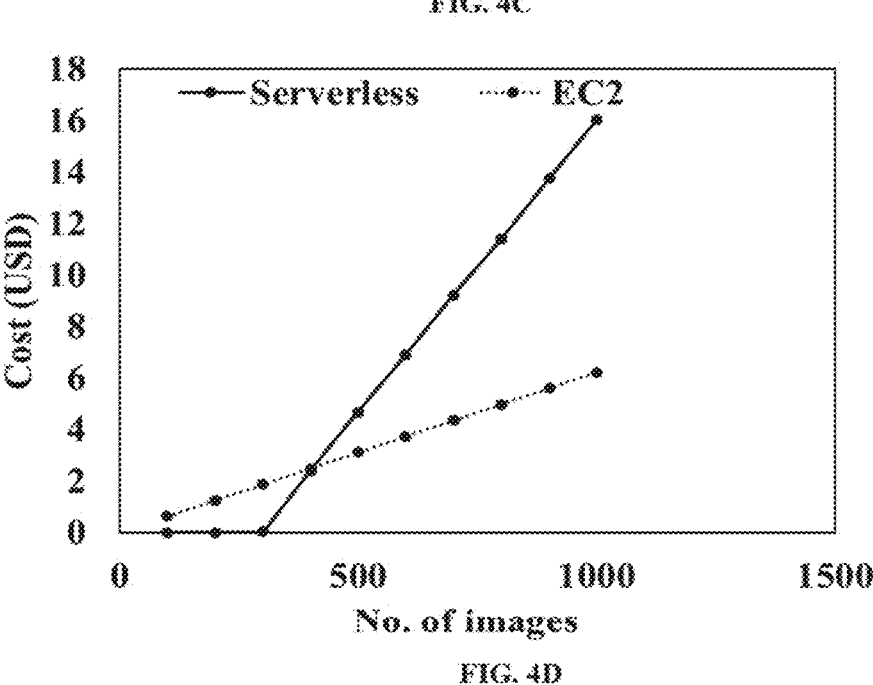
Figure 4E:
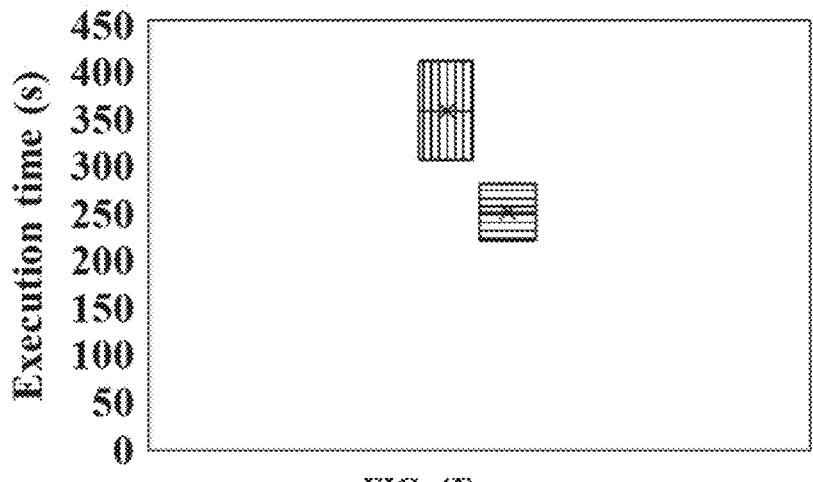
Figure 4F:
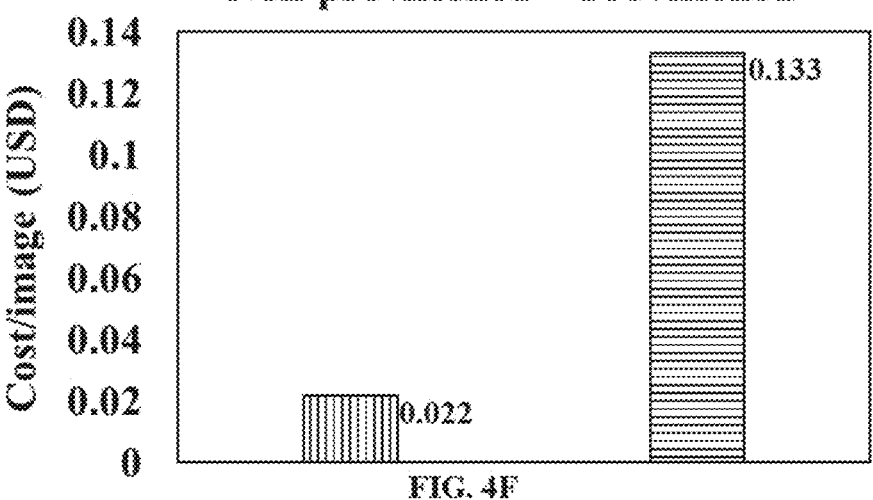

The workloads of varying sizes are executed in the serverful environment (for example, an on-premises server) in a controlled environment to calculate the resource demand of each API and the model used in the application. The workload with a varying configuration of the on-premises server, also referred to as server, is processed and record the execution time of each of the API. Based on the resource demand, a performance model is built to predict the execution time for different configurations of serverless instances. An optimal configuration of the serverless instance results in significant cost savings without compromising the performance of the application. A scheme is disclosed to estimate the optimal configuration of the serverless instance memory configuration and hence the number of cores. The extraction application consists of multiple APIs invoking multiple deep learning models. To expedite the execution of documents, these APIs are multi-threaded such that some of the functions can be executed in parallel. For example, OCR API slices document images into nine parts for processing by an equivalent number of CTPN Models™ as shown in FIG. 3A. Each of these functions is characterized in isolation to estimate the effect of memory and hence compute power on the execution time of the workload. FIGS. 4A and 4B depict performance analysis of two document reader APIs on an example serverful execution environment. FIG. 4C depicts the comparison of the document image processing time observed with on-premises server deployment (serverful execution environment) of the information extraction application with varying server configurations (12, 24, 48 cores) versus serverless deployment. FIG. 4D depicts the cost comparison of serverless instance and a virtual machine. FIG. 4E depicts comparison of the document image processing time using provisioned and non-provisioned resources requiring 14 serverless instances. FIG. 4F depicts cost comparison of provisioned and non-provisioned resources for processing one image requiring 14 serverless instances.

The execution time of executing one slice with changing the number of cores on a machine is as shown in FIG. 4A, wherein an improvement of 1.7× can be seen in the execution time when the number of cores is increased from 1 to 2. However, there is an insignificant improvement in the execution time beyond that. The characterization of the table API is shown in FIG. 4B. There is not seen any significant improvement in the execution time beyond 3 cores. Based on this observation, while deploying the OCR API on serverless instances, system 100 utilizes one serverless instance to process one slice of the image. Each of the nine instances is configured with only 4 GB (more than 2 cores) instead of the available 10 GB of memory. Also, only 4 GB memory is used for the table API implementation to acquire 3 cores.

The experimental evaluation of performance and cost with serverless instances for some of the configurations is as shown in Table III. Configuration 1 results in a very high cost while configuration 3 has the largest execution time at the lowest cost. Configuration 2 results in a good performance and cost trade-off. The optimal configuration closely matches with the configurations suggested by our characterization approach described above. The characterization data is used to configure all the serverless instances optimally. This results in significant cost savings when all the APIs are deployed on serverless instances that are configured optimally.

TABLE III

| Config- uration | Memory (GB) | | | | Total processing time(s) | Cost per 100 pages (USD) |
|---|---|---|---|---|---|---|
| | OCR | DataType | Spatial relation | Table Detect | | |
| 1 | 10 | 1 | 1 | 10 | 83 | 68.1 |
| 2 | 3 | 1 | 1 | 4 | 95 | 24.47 |
| 3 | 3 | 1 | 1 | 3 | 102 | 23.67 |

TABLE IV

| | API type | | | |
|---|---|---|---|---|
| | OCR | DataType | Spatial relation | Table Detect |
| Memory used (GB) | 4 | 2 | 2 | 4 |
| Number of instances | 10 | 1 | 1 | 2 |

The workload characterization of any application of interest is automated by the system 100. Thus, for a given inference request, the system 100 evaluates the execution time of each API of the application for processing an image (for example, the Deep reader application herein). The execution time is evaluated by varying the resources such as number of cores or memory size. The system 100 is configured to find optimal resource requirements for each API such that resource configuration below this results in performance degradation while higher configuration does not provide any further performance gain.

EXPERIMENTAL SETUP: The on-premises version of the Deep Reader is deployed on an Intel Xeon™ 1359v2@2.45 GHz machine with 24 physical cores configured with 256 GB of memory. All the AWS cloud services used in the experiments are deployed in the ap-south-1 region. The configuration of Lambda instances used in the experiments is based on the workload characterization performed for the Deep Reader. Storage services S3 and EFS, Lambda instances, and VMs are placed in one VPC. The document images chosen for the experiments consist of different categories including invoices, receipts, and bank statements, etc. Each experiment has been repeated a minimum of three times and average values of the metrics are considered. The cost data presented in the experiments include the workload-dependent pricing for using a service. It does not include static charges that are independent of the workload.

EXPERIMENTAL RESULTS: In this section, the experiments conducted to evaluate the cost and performance trade-offs using the Deep Reader application as a use case are discussed.

Expt1—On-premises vs Lambda Deployment: In this experiment, the scaling in Lambda against on-premises (bare metal) deployment is compared. As shown in FIG. 4C, as the workload is increases by increasing the number of documents to process concurrently, the execution time increases linearly for smaller concurrencies and then super linearly for larger concurrencies. This is due to the fact that servers are underutilized. However, the execution time with Lambda instances does not change with the increasing workload. This is because as workload increases, due to auto-scaling, a proportional number of Lambda instances are increased instantaneously resulting in constant execution time. The problem of increasing execution time for on-premises deployment at larger workloads can be solved by increasing the number of servers which requires investment upfront and may not be cost-efficient when resources are idle. Another solution adopted by enterprises is the use of flexible infrastructure available on cloud. Cloud services provide resource scale-up and scale-down features for dynamically varying workloads. However, one drawback here is that the start-up time of the new VM instances on scale-up is higher in comparison to the cold start of a few seconds in serverless instances. Hence, a serverless platform is a better solution for dynamically varying workloads.

Expt2—Serverless vs EC2 Cost Comparison: Both AWS Lambda™ and EC2 (Elastic Compute Cloud)™ use the pay-per-use cost mode. In the case of the EC2 VM instance, the cost is dependent on the time for which the instance is up and running. In this study, the cost of Lambda and EC2 instances is compared for varying workloads. An m5ad.12× large type EC2 VM instance with 48 cores is used and 192 GB memory at the price of USD 1:61=hour(hr.) for the cost comparison. Each Lambda instance is configured with 3 GB of Memory such that the total number of cores from all the instances is same as in the EC2 VM instance. As shown in FIG. 4D, for smaller workloads, the cost of using Lambda is insignificant due to 400,000 free tiers GBs available for low or medium-size workloads. However, as the workload increases (the number of document images in the Deep Reader application mentioned herein), the use of EC2 becomes cost-effective. One conclusion can be derived from this study that AWS Lambda™ is cost-effective for low to moderate traffic (close to 400000 GB-s load) while a dedicated EC2 instance can deliver the same performance at a lower cost for heavy workloads. Although serverless is not cost-effective at heavy workloads, it is still an attractive option due to its high scalability. Moreover, serverless is a platform of choice when dealing with dynamically varying workloads due to quick provisioning.

Expt3-Provisioned vs Non-provisioned Concurrency: In this study, the effect of AWS provisioned and non-provisioned concurrency on document image processing time and cost is understood. AWS™ has recently introduced provisioned concurrency features in Lambda to mitigate the cold start issue. In this experiment, a total of 14 Lambda instances for OCR (10), Data type API (1), Spatial Relationship Creator (1), Table Detection API (2) are provisioned. A single image is processed multiple times with minimum of 10 minutes gap to get a cold start for each run. As shown in FIG. 4E, the total average execution time observed for processing an image with provisioned concurrency is smaller than the non-provisioned concurrency. Also, the variation in execution time across multiple runs is smaller for provisioned concurrency as compared to non-provisioned concurrency. However, the expected cost of using provisioned is higher than non-provisioned concurrency as in FIG. 4F. In this experiment, the effect of S3 and EFS on performance and cost is studied. As discussed in section, AWS provides S3 and EFS as a storage option for the deep learning models, images, and intermediary files used in our deployment. The application models are accessed once per invocation of the serverless function. All the intermediary small files are frequently generated and used by multiple functions.

Figure 5A:
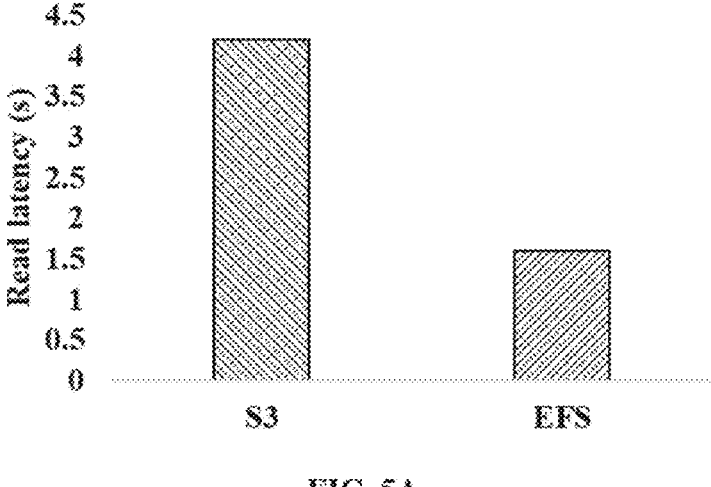
FIGS. 5A through 5D (collectively referred as FIG. 5) depict comparative analysis of the document reader application, while using various storage options provided by the example serverless execution environment utilized by the system of FIG. 1, in accordance with some embodiments of the present disclosure.
Figure 5B:
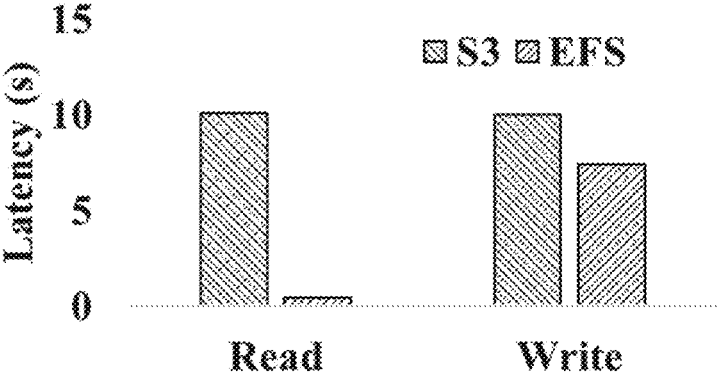
Figure 5C:
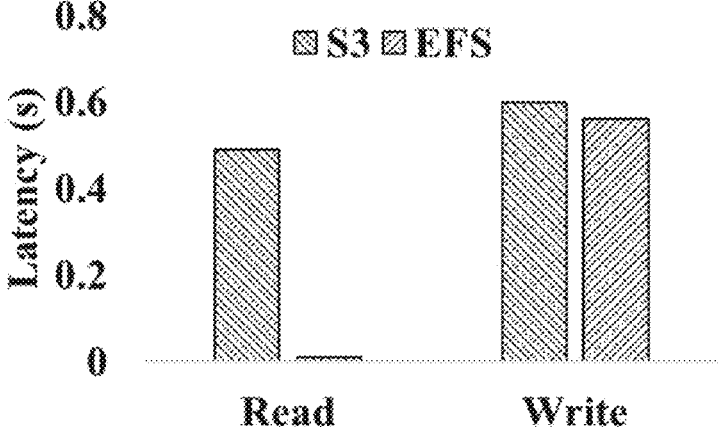
Figure 5D:
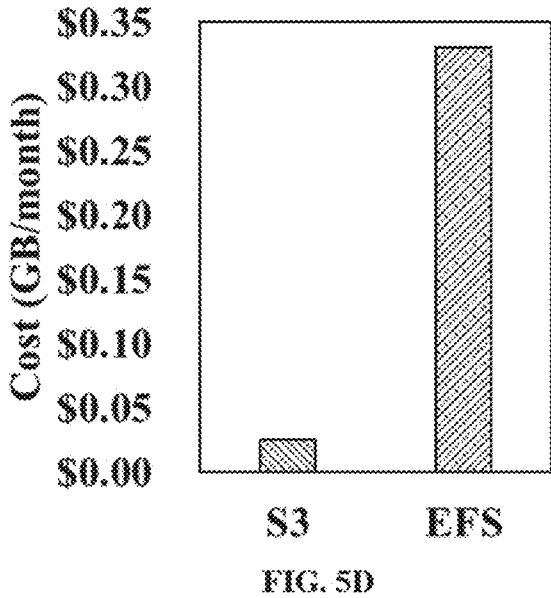

FIGS. 5A through 5D depict comparative analysis of the document reader application, while using various storage options provided by the example serverless execution environment utilized by the system of FIG. 1, in accordance with some embodiments of the present disclosure. FIG. 5A shows the model read latency comparison of S3 and EFS. Although the read latency of S3 is higher as compared to EFS, the cost of S3 is much lower as compared to EFS as depicted in FIG. 5D. Large models and document images that are accessed only once during serverless function invocation are kept in S3 as it proves to be a cost-effective solution for the persistent storage of a large number of document images and large size models (180 MB or more). However, frequently accessed small intermediary files and bounding box images (nearly 110 small images for one document image) are saved in EFS due to the better read and write latency as shown in FIGS. 5B and 5C. From the experimental evaluation presented above, following points can be inferred:

1. Use of serverless platform for deploying applications similar to information extraction results in constant execution time even with increasing workload due to scalability and quick provisioning of serverless functions.
2. EFS storage is a better option for achieving low latency read and write in frequently accessed small files while S3 is cost-effective and recommended for infrequently accessed models and images.

3. Provisioned concurrency mitigates the problem of a cold start to some extent but at a higher cost.
4. The workload characterization results in a cost-effective deployment of complex applications containing multiple APIs and models.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for workload characterization-based capacity planning for a serverless execution environment, the processor implemented method comprising:

receiving, via one or more hardware processors, an application to be executed in the serverless execution environment; and performing, via the one or more hardware processors, the workload characterization-based capacity planning of the application using a serverful execution environment, wherein performing the workload characterization-based capacity planning comprising:

checking whether a storage requirement of the application, to create an execution environment of the application, is more than a maximum temporary storage available on a serverless instance of the serverless execution environment;

refactoring the application into a plurality of Application Programming Interfaces (APIs) if the storage requirement is more than the maximum temporary storage, wherein the plurality of APIs are independent of each other and run on a plurality of serverless instances of the serverless execution environment, wherein a Point to Point (P2P) communication between the plurality of APIs is performed using an Elastic File System (EFS) enabling the plurality of APIs to read and write data from the EFS, wherein the plurality of APIs pertain to an information extraction and includes an Optical Character Recognition (OCR) API, a Data Type API, a Spatial Relation Creator API, and a Table Detection API;

checking whether a compute requirement of each of the plurality of APIs is within a maximum number of cores provided by the serverless execution environment;

in response to determining that the compute requirement of one or more APIs among the plurality of APIs is not satisfied by the maximum number of cores, performing one of:

a) refactoring the one or more APIs into multiple APIs till the compute requirement is below the maximum number of cores; and b) launching each thread on a unique serverless instance, if the one or more APIs have a multi-threaded component, and functions are executed in parallel;

running each data unit from among a plurality of data units in a dataset used by the application for each of the plurality of APIs on the serverful execution environment by varying number of cores provided by a server in the serverful execution environment from a minimum number of cores to the maximum number of cores if the compute requirement is satisfied by the maximum number of cores, wherein the plurality of data units in the dataset comprise a mix of identical data units and unidentical data units for similar type of data;

determining an average execution time for each data unit from among the plurality of data units of the dataset for each of the plurality of APIs;

recording an optimal number of cores for each of the plurality of APIs, beyond which there is no further decrease in execution time of each of the plurality of APIs; and configuring the plurality of serverless instances for executing the application in accordance with the optimal number of cores for each of the plurality of APIs in the serverless execution environment.

2. The processor implemented method of claim 1, wherein the processor implemented method further comprises providing a cost model for evaluating a total cost of end-to-end deployment of the application, which utilizes a plurality of services of the serverless execution environment, wherein the total cost is evaluated for a plurality of scenarios of usage of the plurality of services based on variations in computational requirements, storage requirements, and network requirements.

3. The processor implemented method of claim 2, wherein the cost model generates recommendations based on cost and performance trade-offs for selecting a deployment architecture of the serverless execution environment.

4. A system for workload characterization-based capacity planning for a serverless execution environment, the system comprising:

a memory storing instructions;

one or more Input/Output (I/O) interfaces; and one or more hardware processors coupled to the memory via the one or more I/O interfaces, wherein the one or more hardware processors are configured by the instructions to:

receive an application to be executed in the serverless execution environment; and perform the workload characterization-based capacity planning of the application using a serverful execution environment, the workload characterization-based capacity planning comprising:

checking whether a storage requirement of the application, to create an execution environment of the application, is more than a maximum temporary storage available on a serverless instance of the serverless execution environment;

refactoring the application into a plurality of Application Programming Interfaces (APIs) if the storage requirement is more than the maximum temporary storage, wherein the plurality of APIs are independent of each other and are run on a plurality of serverless instances of the serverless execution environment, wherein a Point to Point (P2P) communication between newly created APIs is performed using an Elastic File System (EFS) enabling the plurality of APIs to read and write data from the EFS, wherein the plurality of APIs pertain to an information extraction and includes an Optical Character Recognition (OCR) API, a Data Type API, a Spatial Relation Creator API, and a Table Detection API;

checking whether a compute requirement of each of the plurality of APIs is within a maximum number of cores provided by the serverless execution environment;

in response to determining that the compute requirement of one or more APIs among the plurality of APIs is not satisfied by the maximum number of cores, performing one of:

a) refactoring the one or more APIs into multiple APIs till the compute requirement is below the maximum number of cores; and b) launching each thread on a unique serverless instance, if the one or more APIs have a multi-threaded component, and functions are executed in parallel;

running each data unit from among a plurality of data units in a dataset used by the application for each of the plurality of APIs on the serverful execution environment by varying number of cores provided by a server in the serverful execution environment from a minimum number of cores to the maximum number of cores if the compute requirement is satisfied by the maximum number of cores, wherein the plurality of data units in the dataset comprise a mix of identical data units and unidentical data units for similar type of data;

determining an average execution time for each data unit from among the plurality of data units of the dataset for each of the plurality of APIs;

recording an optimal number of cores for each of the plurality of APIs, beyond which there is no further decrease in execution time of each of the plurality of APIs; and configuring the plurality of serverless instances for executing the application in accordance with the optimal number of cores for each of the plurality of APIs in the serverless execution environment.

5. The system of claim 4, wherein the one or more hardware processors are further configured execute a cost model for evaluating a total cost of end-to-end deployment of the application, which utilizes a plurality of services of the serverless execution environment, wherein the total cost is evaluated for a plurality of scenarios of usage of the plurality of services based on variations in computational requirements, storage requirements, and network requirements.

6. The system of claim 5, wherein the cost model is configured to generate recommendations based on cost and performance trade-offs for selecting a deployment architecture of the serverless execution environment.

7. One or more non-transitory machine-readable information storage mediums comprising one or more instructions which when executed by one or more hardware processors cause:

receiving, an application to be executed in the serverless execution environment; and performing, the workload characterization-based capacity planning of the application using a serverful execution environment, wherein performing the workload characterization-based capacity planning comprising:

checking whether a storage requirement of the application, to create an execution environment of the application, is more than a maximum temporary storage available on a serverless instance of the serverless execution environment;

refactoring the application into a plurality of Application Programming Interfaces (APIs) if the storage requirement is more than the maximum temporary storage, wherein the plurality of APIs are independent of each other and run on a plurality of serverless instances of the serverless execution environment, wherein a Point to Point (P2P) communication between the plurality of APIs is performed using an Elastic File System (EFS) enabling the plurality of APIs to read and write data from the EFS, wherein the plurality of APIs pertain to an information extraction and includes an Optical Character Recognition (OCR) API, a Data Type API, a Spatial Relation Creator API, and a Table Detection API;

checking whether a compute requirement of each of the plurality of APIs is within a maximum number of cores provided by the serverless execution environment;

in response to determining that the compute requirement of one or more APIs among the plurality of APIs is not satisfied by the maximum number of cores, performing one of:

a) refactoring the one or more APIs into multiple APIs till the compute requirement is below the maximum number of cores; and b) launching each thread on a unique serverless instance, if the one or more APIs have a multi-threaded component, and functions are executed in parallel;

running each data unit from among a plurality of data units in a dataset used by the application for each of the plurality of APIs on the serverful execution environment by varying number of cores provided by a server in the serverful execution environment from a minimum number of cores to the maximum number of cores if the compute requirement is satisfied by the maximum number of cores, wherein the plurality of data units in the dataset comprise a mix of identical data units and unidentical data units for similar type of data;

determining an average execution time for each data unit from among the plurality of data units of the dataset for each of the plurality of APIs;

recording an optimal number of cores for each of the plurality of APIs, beyond which there is no further decrease in execution time of each of the plurality of APIs; and configuring the plurality of serverless instances for executing the application in accordance with the optimal number of cores for each of the plurality of APIs in the serverless execution environment.

8. The one or more non-transitory machine-readable information storage mediums of claim 7, wherein the one or more instructions which when executed by the one or more hardware processors further cause providing a cost model for evaluating a total cost of end-to-end deployment of the application, which utilizes a plurality of services of the serverless execution environment, wherein the total cost is evaluated for a plurality of scenarios of usage of the plurality of services based on variations in computational requirements, storage requirements, and network requirements.

9. The one or more non-transitory machine-readable information storage mediums of claim 8, wherein the cost model generates recommendations based on cost and performance trade-offs for selecting a deployment architecture of the serverless execution environment.

* * * * *